United States Patent [19]
Guillin et al.

[11] Patent Number: 5,183,076
[45] Date of Patent: Feb. 2, 1993

[54] UNIDIRECTIONAL FLOW LIMITER

[75] Inventors: Daniel Guillin, Montsoult; Michel Nicolas, Neauple Le Chateau, both of France

[73] Assignee: Telemecanique, Rueil-Malmaison, France

[21] Appl. No.: 757,172

[22] Filed: Sep. 10, 1991

[30] Foreign Application Priority Data

Sep. 14, 1990 [FR] France ............... 90 11412

[51] Int. Cl.[5] .................................... F16K 21/02
[52] U.S. Cl. ........................... 137/513.7; 137/599; 251/365
[58] Field of Search .............. 137/513, 513.7, 599; 251/359, 365

[56] References Cited

U.S. PATENT DOCUMENTS

| | | | |
|---|---|---|---|
| 2,922,432 | 1/1960 | Huntington et al. | 137/513.7 X |
| 4,071,045 | 1/1978 | Brandt | 137/528 |
| 4,100,935 | 7/1978 | Harnish | 137/533.11 |
| 4,214,607 | 7/1980 | Bouteille | 137/513.7 X |
| 4,742,849 | 5/1988 | Prudhomme et al. | 137/513.7 X |

FOREIGN PATENT DOCUMENTS

| | | |
|---|---|---|
| 3215696 | 10/1983 | Fed. Rep. of Germany . |
| 2307205 | 11/1976 | France . |
| 2473671 | 7/1981 | France . |
| 972053 | 10/1964 | United Kingdom . |

Primary Examiner—John Rivell
Attorney, Agent, or Firm—Griffin, Butler, Whisenhunt & Kurtossy

[57] ABSTRACT

The unidirectional limiter comprises a body, each of the ends of which is provided with a connection, a closure member mounted movably between a seat and an abutment element and a throttle ring mounted rotatably on the body of the valve for modifying the section of a throttle passage which is formed in the body and which passes around the valve seat. According to the invention the seat is formed at the end of the internal sleeve member of plastics material, which is latched by axial introduction in the internal bore in the body.

9 Claims, 1 Drawing Sheet

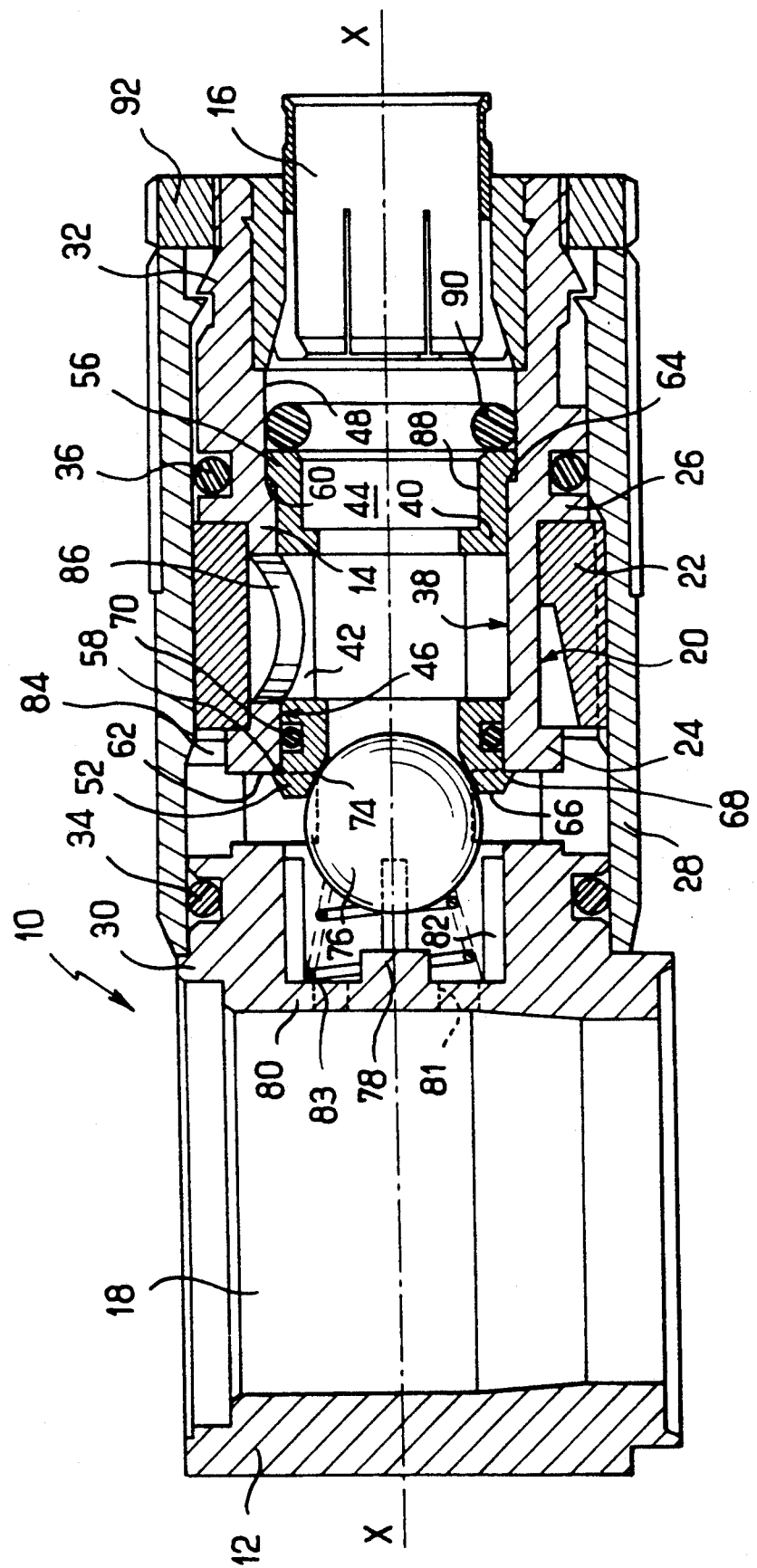

UNIDIRECTIONAL FLOW LIMITER

FIELD OF INVENTION

The present invention concerns a unidirectional flow limiter, in particular for a pneumatic fluid.

BACKGROUND OF INVENTION

The invention more particularly concerns a unidirectional flow limiter of the type described and illustrated in German Patent Specification No DE-A-3 215 696. German Patent Specification No DE-A-3 215 696 discloses a unidirectional flow limiter comprising a tubular body, each of the two oppositely disposed axial ends of which is provided with means for connection to a fluid conduit system, comprising an axial duct passing through a valve seat and in which is accommodated a ball for closing off said duct, being movable between the seat and an abutment element which is axially spaced from the seat. In by-pass relationship to the first duct at the boundaries of the valve, a second duct is defined by two radial orifices which are disposed in the wall of the body on each side of the seat, and by an annular conduit connecting them to the exterior of the body, the conduit being disposed between the latter and an external sleeve. A separate ring which is mounted rotatably on the body makes it possible to uncover to a greater or lesser degree the mouth of one of the radial orifices where it opens into the annular conduit, so that by rotary movement it is possible to adjust the flow section of the by-pass duct and therefore the flow which can pass therethrough.

The throttle ring is advantageously made of elastic material and is mounted with a slight radial gripping effect on the cylindrical surface portion which receives it.

It appeared desirable to improve certain aspects of a flow limiter of that type in order to improve the performance thereof and to reduce the manufacturing costs thereof.

In fact, in the limiter disclosed in that document, the body is a solid metal component with the valve seat machined directly in the internal bore therein. Such cutting operations are generally expensive. In addition, the axial abutment element for the closure ball is a separate added component which is produced either in the form of a transverse pin engaged into an opening in the wall of the tubular body, or in the form of an axial finger which extends from the end face of a liner member which is a force fit in the internal bore in the body.

Besides the cost of all those machining and assembly operations, the operation of fitting the retaining element into position gives rise to stresses in the body which can result in deformation phenomena, in particular at the bearing surface of the throttle ring, so that there is no guarantee that the ring will enjoy good contact and sealing integrity at that location is less than perfect, which would be detrimental to good operation of the flow limiter if the body were not metal. Now, making such a device entirely of plastics material is a highly important factor in terms of reducing cost, but in that case the known structure is not appropriate. It is an object of the present invention to resolve this problem.

SUMMARY OF THE INVENTION

The present invention concerns a unidirectional flow limiter in which the seat for the closure ball is carried by the end of an internal sleeve member latched into a portion of the internal bore in the body, into which it is axially introduced.

The latching action establishes an axial connection between the seat-carrying sleeve member and the body of the limiter without giving rise to a radial stress between the two components, which therefore avoids any inopportune deformation of the sliding bearing surface for the throttle ring, which permits the body of the limiter to be made of plastics material.

That separation into two components of the assembly of the valve seat and the body of the limiter having the connecting means makes it possible to simplify production of the limiter. It also permits the unidirectional flow limiter function to be integrated into connecting members which are know as 'banjo connections' in which the restriction section is to be found on the path of flow of the fluid coming from the screw member for fitting the connection to a piece of pneumatic equipment (distributor or jack). Finally, for the same nominal dimensions, the member bearing the seat is identical for all the forms of body which have to be produced (straight body, banjo body, T-shaped connections ...) and the various types of connecting elements.

Preferably the internal sleeve member is also on plastics material and comprises two radial end flanges co-operating with two internal radial shoulders on the body, on respective sides of a mouth of the by-pass duct where it opens into the bore, one of the flanges being externally chamfered to facilitate axial introduction thereof into the body of the limiter, the sleeve member further comprising an orifice in line with that mouth opening.

A toric sealing joint is arranged between the facing cylindrical surfaces of the internal sleeve member and the internal bore portion which are disposed between the valve and the mouth opening of the by-pass duct.

In accordance with another feature of the invention the body of the limiter is in the form of a 'banjo' connection body, the seat of the valve being towards the end of the connection through which the fitting screw member passes.

Other features and advantages of the invention will be apparent from the following detailed description which is given by way of non-limiting example and for understanding which reference will be made to the accompanying drawing in which the single FIGURE is a view in axial section of a preferred embodiment of a unidirectional flow limiter in accordance with the teachings of the present invention.

BRIEF DESCRIPTION OF THE DRAWINGS

The sole FIGURE illustrates a unidirectional flow limiter, the functional means of which are of the type described in DE-A-3 215 696 and more particularly the type illustrated in FIG. 4 of that document. DE-A-3 215 696 is incorporated herein by reference.

DETAILED DESCRIPTION OF PREFERRED EMBODIMENTS

In regard to the array of features which are common to the valve according to the invention and that which is the subject-matter of DE-A-3 215 696, which will not be described in detail in the following description, reference may advantageously be made to the content of that previously published document.

The limiter 10 comprises a body 12 having a general axis as indicated at X—X, the general shape of the body 12 being that of a cylindrical sleeve. The body 12 is of injection-moulded plastics material.

The body 12 comprises a central portion 14 and two connecting elements 16 and 18 disposed at each of the opposite axial ends of the body. The connecting elements 16 form a quick-action claw-type connection which is known per se while the element 18 has a transverse bore which is perpendicular to the axis X—X of the tubular body 12 and which is intended to receive a hollow screw member for fixing and connecting the limiter to an item of equipment (for example a jack). The element 16 may be of a different configuration, for example in the form of a screwthread. The element 18 may receive a screw member which, in addition to its fixing function, has a function which is strictly speaking pneumatic, for example a blocking or cut-off function.

In known manner, the external cylindrical surface portion 20 of the central part 14 of the body 12 rotatably carries a throttle ring 22 which is axially immobilised between two external radial shoulders 24 and 26 on the body 12.

The throttle ring 22 is fixed in respect of rotary movement to an external control sleeve 28 which is axially immobilised between two external radial shoulders 30 and 32 on the body.

Two toric seals 34 and 36 which are disposed in groove in the body 12 provide for sealing integrity between the body 12 and the control sleeve 28.

In the central part 14, the internal bore 38 in the body 12 receives an internal sleeve member 40 which is made of plastics material and which comprises a lateral orifice 42 in its central portion.

The sleeve member 40 comprises an internal duct 44 which permits the flow of fluid and its external cylindrical surface 46 is freely received in the internal bore 38 of the body 12.

The sleeve member 40 is set in position in the bore 38 by latching in the body 12.

For that purpose the central portion 38 of the internal bore is prolonged axially in the direction of the axial end of the body at the right when looking at the FIGURE, by an introduction bore 48 which is capable of receiving and guiding two external radial shoulders 52 and 56 on the sleeve member, which are formed at the opposite axial ends thereof.

The mutually facing radial faces 58 and 60 of the shoulders 52 and 56 co-operate with two corresponding radial surfaces 62 and 64 of the body 12.

In order to facilitate axial introduction of sleeve member 40 into the internal bore 38, the axial end face 66 of the radial shoulder 52 comprises an introduction chamfer 68.

A toric seal 70 provides for sealing integrity between the cylindrical surface 38 and 46.

The end face 66 of the sleeve member comprises a conical valve seat 74 with which a closure ball 76 co-operates; the ball will be non-metallic (for example of polyurethane).

The ball 76 is mounted axially movably in the internal bore in the body 12 between the seat 74 and the end of an axial abutment finger 78 projecting from a dividing wall 80 between the bore 38 and the bore of connecting element 18.

The ball 76 is guided in its movements between the seat 74 and the abutment 78 by axial splines 82 which are distributed around the axis X—X. The internal bore 38 in the body communicates with the bore of connecting element 18 by way of orifices 81 provided in the dividing wall 80. On the other hand, a spring 83 may be provided between the body 12 and the ball 76 for prepositioning of the ball against its seat 74 and to produce a non-return effect in dependence on calibration of the spring.

In a manner which is known in particular from the document referred to in the preamble to this specification, the body of the limiter defines, with the external sleeve 28, a by-pass duct 84 at the boundaries of the seat 74 for circumventing same. The duct 84 comprises a flow section which can be regulated by the ring 22, the angular position of which defines the degree of masking of the orifice 86 provided in the body 12, which belongs to the duct 84.

It will be noted moreover that, at its end which is in opposite relationship to the seat a 74, the sleeve member 40 comprises a recess or housing 88 in which can be accommodated the end of a tube (not shown) which will be connected to the limiter by the connecting means 16. The function of the recess or housing 88 is provide for centred support for the end of the tube in such a way that a toric seal 90 can effectively provide for sealing integrity of the connection.

Apart from the components of the connecting means 16 which are metal, all the parts of the limiter are of plastics material. It is therefore easy to provide for assembly of the arrangement by latching engagement of the sleeve member 40 to the body 12 and the sleeve 28 to the body 12. The metal parts are inserted in known manner by cramping. It will be noted finally that the arrangement has a nut 92 for locking the sleeve 28 in the selected angular position.

While the foregoing there has been set forth a preferred embodiment of the invention, it is to be understood that the invention is only to be limited by the spirit and scope of the appended claims.

We claim:

1. In a unidirectional flow limiter, in particular for pneumatic fluid, of the type having a tubular body, the ends of which have connecting means for connection to an installation and an item of equipment of the installation, said tubular body having passing therethrough an axial duct connecting said connecting means and passing through a valve seat which faces in the direction of the axial duct in which a closure ball is accommodated between the seat and an abutment element which is axially spaced from the seat, a by-pass duct connected to the axial duct on respective sides of the valve seat, a throttle ring being mounted rotatably on an external portion of the tubular body to modify the section of the by-pass duct, the improvement wherein the connecting means for connection to the item of equipment has a bore which is perpendicular to the axial duct for the passage of a screw member for fixing the tubular body to the item of equipment, and the seat for the ball is carried by an internal sleeve member secured to a portion of an internal bore in the tubular body, which bore constitutes a part of the axial duct and is larger than the diameter of the ball, said sleeve member being axially introduced into said bore after introduction of said ball.

2. A limiter according to claim 1 wherein the abutment element is carried by a dividing wall between the duct and the internal bore in the tubular body.

3. A limiter according to claim 2 wherein the axial duct passes through the dividing wall by way of orifices.

4. A limiter according to claim 1 wherein the tubular body and the sleeve member are of plastics material.

5. A limiter according to claim 1 wherein the internal sleeve member is axially immobilised in the internal bore of the tubular body by two external radial shoulders whose mutually facing radial surfaces co-operate with two corresponding radial surfaces formed in the internal bore.

6. A limiter according to claim 5 wherein one of the radial shoulders comprises a chamfer for introduction of the sleeve member into the internal bore.

7. A limiter according to claim 6 wherein the valve seat and said radial shoulder are formed at the same axial end of the internal sleeve member.

8. A limiter according to claim 1 including sealing means disposed between the facing cylindrical surfaces of the internal sleeve member and the internal bore between connections of the by-pass duct to the axial duct.

9. A limiter according to claim 7 wherein the seat of the valve is carried by the end of the internal sleeve member which is adjacent to the connecting means bore.

* * * * *